US006955844B2

(12) United States Patent
Tagge et al.

(10) Patent No.: US 6,955,844 B2
(45) Date of Patent: Oct. 18, 2005

(54) CONSTRUCTION MATERIALS CONTAINING SURFACE MODIFIED FIBERS

(75) Inventors: Christopher D. Tagge, San Carlos, CA (US); Jacob Freas Pollock, Berkeley, CA (US); Lennard Torres, Pleasanton, CA (US); David S. Soane, Piedmont, CA (US); Ken Saito, Berkeley, CA (US)

(73) Assignee: Innovative Construction and Building Materials, Emeryville, CA (US)

( * ) Notice: Subject to any disclaimer, the term of this patent is extended or adjusted under 35 U.S.C. 154(b) by 101 days.

(21) Appl. No.: 10/446,889

(22) Filed: May 27, 2003

(65) Prior Publication Data

US 2003/0219580 A1 Nov. 27, 2003

Related U.S. Application Data

(60) Provisional application No. 60/383,335, filed on May 24, 2002, and provisional application No. 60/463,138, filed on Apr. 14, 2003.

(51) Int. Cl.$^7$ ................................................. B32B 7/08
(52) U.S. Cl. ..................... 428/53; 428/36.4; 428/36.91; 428/310.5; 428/339; 428/223; 428/294.7; 206/524.3
(58) Field of Search .............................. 428/36.4, 36.91, 428/53, 310.5, 339, 223, 294.7; 206/524.3

(56) References Cited

U.S. PATENT DOCUMENTS

| | | | |
|---|---|---|---|
| 4,045,510 A | 8/1977 | Login | 260/830 |
| 4,098,842 A | 7/1978 | Login | 260/857 |
| 5,108,780 A | 4/1992 | Pitt et al. | 427/40 |
| 5,155,174 A | 10/1992 | Chang et al. | 525/329.1 |
| 5,240,770 A | 8/1993 | Moriga et al. | 428/372 |
| 5,270,384 A | 12/1993 | Chang et al. | 525/54.1 |
| 5,284,910 A | 2/1994 | Chang et al. | 515/54.1 |
| 5,288,775 A | 2/1994 | Bischoff et al. | 524/2 |
| 5,306,782 A | 4/1994 | Chang et al. | 525/355 |
| 5,482,551 A | 1/1996 | Morris et al. | 106/772 |
| 5,618,622 A | 4/1997 | Gillberg-Laforce et al. | 428/357 |
| 5,683,772 A | * 11/1997 | Andersen et al. | 428/36.4 |
| 5,773,138 A | 6/1998 | Seethamraju et al. | 428/326 |
| 5,830,548 A | * 11/1998 | Andersen et al. | 428/36.4 |
| 5,981,067 A | 11/1999 | Seethamraju et al. | 428/393 |
| 6,197,423 B1 | 3/2001 | Rieder et al. | 428/397 |
| 6,207,241 B1 | 3/2001 | Mody et al. | 428/34.1 |
| 6,210,792 B1 | 4/2001 | Seethamraju et al. | 428/326 |
| 6,228,163 B1 | 5/2001 | Espinoza et al. | 106/778 |
| 6,265,056 B1 | 7/2001 | Rieder et al. | 428/294.7 |
| 6,342,284 B1 | 1/2002 | Yu et al. | 428/70 |
| 6,380,289 B1 | 4/2002 | Thompson, Jr. et al. | 524/198 |
| 6,406,535 B1 | 6/2002 | Shintome | 106/705 |
| 6,414,048 B1 | 7/2002 | Sanduja et al. | 522/42 |
| 6,514,449 B1 | 2/2003 | Paulauskas et al. | 264/400 |
| 2001/0023019 A1 | 9/2001 | Rieder et al. | 428/364 |
| 2003/0154888 A1 | 8/2003 | Yu et al. | 106/772 |
| 2003/0181114 A1 | 9/2003 | Newton et al. | 442/149 |

FOREIGN PATENT DOCUMENTS

| | | |
|---|---|---|
| GB | 815184 | 6/1959 |
| JP | 55-48229 | 4/1980 |
| JP | 7-252778 | 10/1995 |

* cited by examiner

*Primary Examiner*—Merrick Dixon
(74) *Attorney, Agent, or Firm*—Ostrolenk, Faber, Gerb & Soffen, LLP; Christopher Paradies

(57) ABSTRACT

Construction materials containing surface modified reinforcements are used to fabricate composite structures. The composite structures comprise a matrix material and surface modified reinforcements, such as fibers and particulates. The surface modifier may be applied to a fiber surface using conventional sizing equipment and provides a durable film on the fiber. The surface modifier may be selected to have multifunctional properties, for example, increasing fiber pull-out strength, imparting bio-active properties, improving moisture resistance and other desirable properties to the composite structure.

55 Claims, 5 Drawing Sheets

CONSTRUCTION MATERIALS CONTAINING SURFACE MODIFIED FIBERS

RELATED APPLICATION

This application claims the benefit of U.S. Provisional Application Ser. No. 60/383,335, to Soane et al., filed May 24, 2002, and U.S. Provisional Application Ser. No. 60/463,138, to Tagge et al., filed Apr. 14, 2003.

FIELD OF THE INVENTION

The field of the invention is cementitious construction materials having fiber reinforcements.

BACKGROUND OF THE INVENTION

Concrete and gypsum wallboard are typically characterized by the ability to withstand large compressive stress. However, tensile strength is generally poor. There has been a longstanding and unresolved need to improve the flexural strength of inorganic building materials. The use of metal, glass, wood, and polymer fibers as reinforcements to improve the tensile and flexural strengths has been attempted, but failed to solve some of the needed improvements.

For example, concrete is often reinforced by rebar, welded wire fabric or synthetic fibers to improve crack control. Rebar must be tied together when added to concrete to provide some structural integrity during earthquakes, for example. In addition, a number of building materials have been disclosed which have substantial quantities of cellulosic fillers, including wood particles and fibers. More expensive and brittle, glass fibers are used in place of wood in applications where greater fire resistance is required. Other fibers and fabrics, such as synthetics, have also been investigated, but failed to adhere to matrix materials used in construction materials. By fabrics, it is meant all woven or non-woven mats of at least one type of fiber, including fiberglass and textiles made of natural or synthetic materials.

Conventional reinforced, inorganic composites suffer from several disadvantages. For example, reinforcing wire mesh currently provides the most common crack control for concrete composites. However, wire is both expensive and prone to corrosion, which degrades the performance of the composite over time. Synthetic fiber reinforcements cost less and have high tensile strength, but have not been incorporated in a networked mesh and have poor adhesion with the matrix. Thus, results have shown comparatively poor crack control properties when compared to wire mesh.

Fiber reinforced gypsum composites also suffer from a variety of drawbacks. At low board weights, the majority of wallboard strength is provided by expensive multi-ply paper face sheets having oriented fibers. Particularly in high humidity climates, the paper facing of wallboard is subject to mold and mildew, which further deteriorates the mechanical properties of the board and produces disagreeable odors and may be harmful to human health. Also, paper face sheets are expensive, contributing approximately 40% to the overall cost of a wallboard.

In addition, conventional fibrous reinforcements, particularly glass, do not adhere well to the gypsum matrix, limiting the efficiency of adding fibers to the matrix. Glass fibers are also brittle and can become easily dislodged during handling, installation, or demolition, causing health hazards, such as skin irritation or lung damage.

The cementitious matrix in composites of concrete and wallboard should support a structural framework that resists compressive loading and transfers tensile loads to the fibers or fabrics that improve tensile strength of the composite material. However, strength and toughness of fiber-reinforced cementitious materials is strongly dependent on the interface between the fibers and the matrix. Most fibers have little interaction with a cement matrix, and thus poor interfacial adhesion. Fiber pullout occurs upon tensile loading. Incorporation of foam or lightweight filler into the matrix to reduce the density of the cementitious building materials exacerbates fiber pullout.

Sizing, an important step used in the preparation of fibers for weaving, involves coating fibers with a warp size. Warp sizes, or sizes, are film-forming polymeric materials which are applied to fibers to protect them from damage during the abrasive weaving process. These sizes are generally formulated to be removed after weaving. Sizing is similarly used in paper production to improve mechanical properties, dimensional stability, and resistance to water or solvents. However, as sizing is removed from fabrics, the use of sizing as a way to decrease pullout or increase interaction between fibers and a cementitious material has not been explored previously.

SUMMARY OF THE INVENTION

A method of producing a fiber-reinforced composite for residential and commercial construction comprises systematic microstructure engineering, designed to create construction materials of controlled morphology at low cost and superior strength, thermal/sound insulation and moisture/fungus/microbial resistance than comparable unreinforced alternatives. Such materials contain natural, synthetic, or inorganic fibers or particles having chemically modified surfaces. For example, the attachment of a multifunctional polymer to a fiber or particle alters the properties of the particle, such as its water-repellent characteristics, tailoring the properties for specific applications.

In one embodiment, an inorganic phase provides mechanical and dimensional stability as well as fire/flame retardancy, and the surface-modified fibers dispersed therein are engineered to have a cohesive bond between the fiber and the matrix. For example, the surface modifier provides bonds from the fibers to both the inorganic phase and an organic component, improving, for example, tensile strength, mechanical performance at low weight, and moisture resistance. In alternative embodiments, the surface-modified fiber reinforcements are either dispersed in the matrix or located in a layer or layers of a composite. The matrix phase is comprised of concrete, gypsum, clays, calcium carbonate, or glass, for example. In alternative embodiments, multifunctional molecules are either a single polymeric molecular form having a plurality of functions or are comprised of a plurality of molecules having a plurality of functions that work together cooperatively to engineer the surface of fibers.

Improvements to conventional cementitious building materials and finishing materials give improved structural integrity and handling characteristics and resist both mold and fungal growth.

In one example, a bio-active additive is anti-fungal, for example, quaternized poly(vinylpyridine) and gluturaldehyde, as discussed in U.S. Provisional Application Ser. No. 60/463,138, to Tagge et al., filed Apr. 14, 2003, which is incorporated in its entirety by reference herein.

In one example particulate or fibrous materials are chemically treated to provide mold-resistance, water repellency or anti-staining. The treatment is achieved using a solution and/or emulsion of functionally designed polymers that bond around or to the fiber surface upon drying and/or curing. A monomer, a functional group and/or a crosslinking agent of the formulation adhere to the fibrous surface, for example by reacting directly with the fibrous surface or with another component of the composition that itself adheres to the fiber surface. Herein mold resistance includes both bio-active measures that destroy mold or fungi and passive measures that merely inhibit mold growth. Preferably, the coating is bio-active, such as gluturaldehyde and/or quaternized poly(vinylpyridine). For example, the treatment modifies the particulate or fibrous surface with functional monomer or polymer appendages or a fine, insoluble coating. In one preferred embodiment, hydrophobic and hydrophilic groups are located in or attached to polymer chains or co-polymers in the formulation.

One advantage is that the surface modification may be durable and permanently bound to the particulate or fibrous surface and not dissolve in water, preventing migration or leaching of the bio-active component or passive inhibitor. In one embodiment, the fibers may be treated prior to weaving or spinning of a textile, eliminating the need for a separate step of sizing the fibers prior to spinning and/or weaving textiles. In an alternative embodiment, the surface modification is either added to an earlier sizing or to a strand of spun fibers or a textile that has no sizing, e.g. the sizing is removed or the fiber was spun without sizing.

Another advantage is that the treatment may be applied to many materials, including paper, woven and non-woven glass mat, and natural and synthetic textiles, as well as a variety of particulate and fibrous materials.

Yet another advantage is that the treatment may provide an interface layer between the fibrous surfaces and the matrix that transfers tensile loads from the matrix to the fibrous reinforcements. Optionally, the interface layer interacts strongly with cement matrices and increases the pullout or peel strength of the fibrous materials. Alternatively, for brittle fibers, the interface is engineered to provide a cohesiveness that optimizes pullout and fracture strength and fatigue life, which is improved with some measurable pullout before failure.

The scope of the invention includes interface layer compositions, e.g. sizing, that interact with cementitious materials, as well as cementitious compositions that interact with inclusions and additives, such as fibers and particles. Improved fibers and fabrics of the present invention may be used to reinforce different types of cements, such as gypsum and Portland cement, depending on the type of fiber and size selected.

Other features and advantages of the present invention will become apparent from the following description of the invention which refers to the accompanying drawings.

One object of the invention is to provide a composite material for concrete, wallboard, ceramic tiles, plumbing fixtures, and countertops with superior mechanical properties. Wallboard is meant, herein, to be a generic term that includes, without being limiting in any way, paper-covered sheet rock, panels for wall, ceiling and floor, underlayment, sheathing board, moisture resistant board, type-X board, insulation board, shaft liner, soffit board, backing board, core board, ceiling board, cement board and gypsum glass mat board.

Another object of the invention is to provide composites by inserting the composite material between any two surfaces, such as wood veneers, for example, to make lightweight doors and panels.

BRIEF DESCRIPTION OF THE FIGURES

For the purpose of illustrating the invention, representative embodiments are shown in the accompanying figures, it being understood that the invention is not intended to be limited to the precise arrangements and instrumentalities shown, but only by the language of the claims.

DETAILED DESCRIPTION

Examples of the present invention will now be described in detail for specific embodiments of the invention. These embodiments are intended merely as illustrative examples and procedures for producing fiber and/or particle reinforced composites. The invention is not to be limited to these specific examples, but only by the language of the claims themselves.

In one embodiment of the invention, surface-modified fibers promote adhesion to gypsum crystals on the molecular scale. For example, an organic fiber component adheres to the gypsum and contributes superior strength to the wallboard, thus eliminating or reducing the need for paper facing. The reduction in board weight enabled by a greater strength allows the incorporation of more porosity, for example. Porosity reduces board weight and also improves other properties, such as thermal insulation and sound attenuation. In one example, a commercially significant reduction in density reduces cost of installation.

In another embodiment, surface-modified fibers promote adhesion to concrete on a molecular scale. The organic fiber component contributes a superior strength and crack control to the concrete, improving the performance and lifetime of the concrete compared to conventional fiber reinforcement.

In yet another embodiment of the invention, surface-modified fibers are chemically modified to produce a hydrophobic surface. The fibers, which are dispersed throughout the gypsum or are formed into a layer on the surface, substantially decrease moisture absorption of the gypsum compared to unmodified fibers. Thus, the composite maintains its mechanical performance in high humidity and is resistant to mold and mildew.

Figure 1:
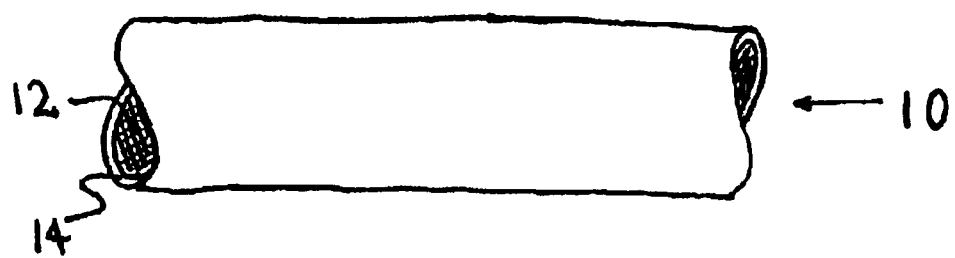
FIG. 1 shows a sketch of one embodiment of the present invention.
Figure 2:
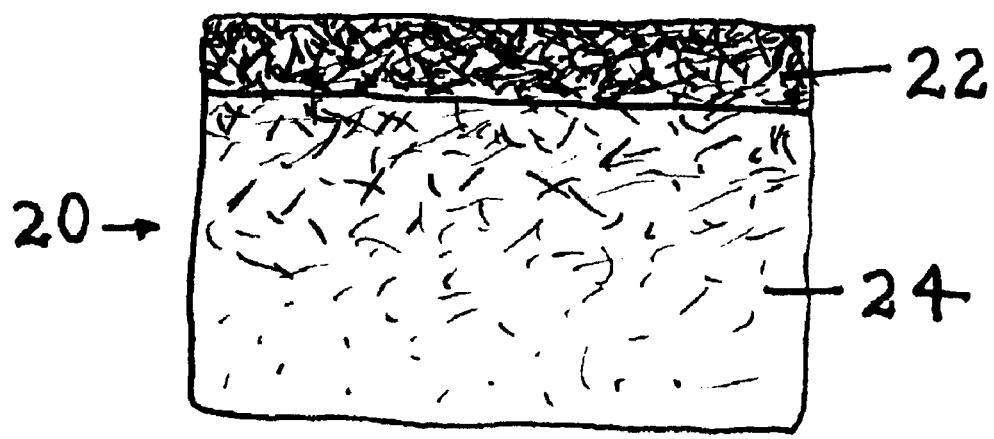
FIG. 2 shows a sketch of another embodiment of the invention.

In another embodiment, as shown in FIG. 2, a wallboard comprises a matrix and surface modified fibers, wherein the fibers form stratified layers 22 and/or a continuous gradient 24 in the matrix 20. For example, the surface layers 22 are rich in chemically surface-modified fibers, which impart high mechanical strength to the board, reducing the need for paper facing. The reduction or elimination of paper facing results in a large cost savings, and improves moisture, fungus/microbial, and fire resistance.

In alternative embodiments, a reduced-paper or paperless wallboard is produced. For example, a reduced-paper wallboard is produced having only a single ply of decorative paper on one or both surfaces.

In another embodiment, fibers are surface-modified with multifunctional molecules that are then chemically crosslinked. The resulting fiber network is formed into a mat, for example, onto which a gypsum slurry is poured and replaces the multi-ply paper face sheets of a wallboard for use as a fire resistant shaft liner. In one example, the surface-modified fiber-mat-faced drywall exhibits improved moisture resistance and thermal insulation when compared to conventional drywall. In an alternative example, the crosslinking is generated in situ during slurry production to form a continuous network throughout the matrix, resulting in substantially improved flexural strength and nail-pull resistance.

In another embodiment of the invention, fibers are surface-modified with multifunctional molecules and then the surface-modified fibers are chemically crosslinked and incorporated into a polymer network within a concrete matrix. The crosslinking is generated in situ during concrete production to form a continuous network throughout the cement of the concrete composite. The resulting network of crosslinked, surface-modified fibers contribute exceptional mechanical strength and crack control for the concrete composite.

In specific embodiments, fibrous and particulate materials, including cellulose materials, such as paper and wood fibers, textile fibers, such as cotton and wool, synthetic polymer fibers, such as nylon and polyester, and inorganic fibers, such as glass and mineral wool, are surface-modified by covalent and/or non-covalent attachment of certain polymers or polymeric groups to the materials. For example, materials comprising modifiable functional groups may be modified, by the covalent attachment of a multifunctional molecule. The modifiable functional groups in the materials are, for example, reactive groups capable of covalently reacting to attach the multifunctional polymer to the material. For example, modifiable functional groups include amine groups, hydroxyl groups, thiol groups, and carboxylic acid groups. In another example, the modifiable functional groups also permit surface-modification by non-covalent bonding of certain pre-polymers, polymers, monomers and/or polymeric groups, by hydrogen bonding interactions, hydrophobic interactions, or salt bridging, for example.

In one embodiment, the surfaces of fibers are modified with multifunctional molecules, which are defined as molecules with two or more regions serving different functions. For example, one region interacts with surface groups to anchor the molecule to the fiber while the other regions perform different functions, such as adhering to gypsum, bioactive protection and/or repelling moisture. For example, fibers, such as stearoyl chloride has an acid chloride group that reacts with surface groups of wood fibers, to anchor the molecule on the fiber, and the stearyl group contributes moisture resistance to the fibers. Another example is 3-aminopropyltriethoxysilane, which, when hydrolyzed under acidic conditions in the presence of glass fibers, attaches the molecule to the surface of the glass fibers. The amine group then reacts with, for example, polyisocyanates to crosslink the fibers into a network.

In one embodiment, multifunctional polymers are used. Herein, the term "multifunctional polymer" means polymers with plural functional groups or regions, such as binding groups, hydrophobic groups, hydrophilic groups, oleophobic groups, bioactive groups, crosslinkable groups and other reactive groups. For example, the multifunctional polymers include both hydrophobic regions and hydrophilic regions or either hydrophobic or hydrophilic regions. Binding functional groups, for example, that enable either non-covalent or covalent binding to the particles and/or fibers are included as another example. Such multifunctional polymers form non-covalent or covalent coatings on the particles and fibers. For example, the binding functional groups are capable of associating with the surface via hydrogen bonds, van der Waals, ionic, and/or hydrophobic, or other non-covalent interactions between the coating molecule and the surface being coated. In another example, the binding groups are reactive groups capable of reacting with functional groups on the surface of the particles and/or fibers forming a covalent bond between the coating polymer and the surface. In yet another example, the multifunctional polymers include hydrophilic functional groups that are capable of interacting with the hydrophilic surface, as well as hydrophobic functional groups capable of repelling water molecules. For example, graft copolymers and block copolymers are capable of comprising both hydrophilic and hydrophobic regions within a polymer chain.

In one embodiment, cellulose materials, such as wood fibers, are surface-modified by the attachment of a "gypsophilic" multifunctional polymer, such as polycarboxylic acids or sulfonates, to provide exceptional adhesion between the fibers and gypsum. The surface of wood fiber contains hydroxyl groups, which may be chemically modified to alter its properties. For example, polyanhydride, such as poly(maleic anhydride), is partially reacted with wood fibers to covalently attach the multifunctional polymers to the surface. The modified wood fibers are then mixed with water and gypsum. The remaining anhydride groups of the multifunctional polymer are hydrolyzed to carboxylic acids. It is believed, without being limiting, that the poly(carboxylic acid) tendrils strongly anchor the fibers in the gypsum crystalline matrix, similar to a root system anchoring a tree in soil. The improved adhesion between the fibers and gypsum produces a gypsum-based composite having superior flexural strength and nail-pull resistance.

In another embodiment, synthetic fibers, such as nylon and polyester, are surface-modified by the attachment of a hydrophilic multifunctional polymer, such as polycarboxylic acids or sulfonates, to provide exceptional adhesion between the fibers and concrete. The surface of nylon fiber contains amine groups, which may be chemically modified to alter its properties. For example, polyanhydride, such as poly(maleic anhydride), is partially reacted with nylon fibers to covalently attach the multifunctional polymers to the surface. The modified nylon fibers are then mixed into cement. The remaining anhydride groups of the multifunctional polymer are hydrolyzed to carboxylate groups during concrete production. The poly(carboxylate) tendrils strongly anchor the fibers in the concrete matrix. The improved adhesion between the fibers and concrete contributes exceptional crack control and mechanical strength to the composite.

In another embodiment, paperless wallboard is produced. Synthetic polymer fibers, such as nylon and polyester, are surface-modified by the attachment of a "gypsophilic" multifunctional polymer, such as polycarboxylic acids or sulfonates, to promote exceptional adhesion between the fibers and gypsum. For example, the surface of polyester fibers contains alcohol groups, which may be chemically modified to alter its properties, by the partial reaction with a polyanhydride to covalently attach the multifunctional polymer to the surface. The modified polyester fibers are then mixed with water and gypsum, hydrolyzing the remaining anhydride groups to carboxylic acids in one alternative embodiment, two separate slurries, one containing a relatively high percentage of modified polyester fibers and the other containing a relatively low percentage of polyester fibers, are prepared. The former slurry, rich in strengthening polyester fibers, is then used to make the relatively thin outer layers, which provide the vast majority of the strength of the wallboard. The latter slurry, having a low percentage of fibers to reduce material cost, forms the core of the wallboard. The sandwich structure improves the strength-to-weight ratio of wallboard such that the expensive paper facing is not needed to surpass wallboard performance requirements. Furthermore, by removing the need for paper, which is flammable and hygroscopic, the wallboard of this invention shows superior moisture repellancy, mold resistance, and fire retardancy.

In another embodiment, the fibers of a wallboard facing paper are chemically modified to produce a hydrophobic surface. The matrix of the facing paper may be made of a resinous compound that binds the fibers of the paper into a sheet, for example. In one example, the fibers of the facing paper are made of a cellulose, for example, wood pulp and/or wood fibers. The hydroxyl groups of the cellulose are modified by the attachment of multifunctional polymers comprising, for example, anhydride groups, which react to anchor the polymer to the fiber, and hydrophobic groups, such as hydrocarbon and fluorocarbon groups, to impart hydrophobic characteristics to the cellulose, and consequently, to the wallboard.

In another embodiment, fibers are incorporated into a polymeric network to produce wallboard of exceptional strength. Multifunctional polymers, such as a polyisocyanate, partially react with the amine groups of nylon fibers to attach the polymers to the surface of the fibers. Hydrolysis converts the unreacted isocyanates to reactive with amine groups. The fibers are then mixed with water, gypsum, and polymeric additive that is reactive with the multifunctional polymer, e.g. with amine reactive groups. For example, a polyurethane pre-polymer, which typically consists of a polyether terminated with diisocyanates is reactive with amine groups. It is believed, without being limiting, that the amine groups of the modified fiber react preferentially with the polyurethane pre-polymer. The remaining pre-polymer reacts with the water in the slurry to form a polyurethane polymer network incorporating the fibers dispersed throughout the slurry. The resulting composite produces a wallboard having exceptional strength and insulation properties.

In one preferred embodiment, co-polymers are polymerized from a mixture of fluoro-aliphatic (meth)acrylate monomers, hydroxyalkyl (meth)acrylate monomers, stearyl (meth)acrylate monomers and chlorinated monomers to form a surface modifier. Herein, the co-polymers of this embodiment are referred to as fluoro-polymers; however, these co-polymers may actually contain little or no fluorinated groups, depending on the desired application. In one example, the fluoro-polymers are applied to fibrous surfaces using an anhydride functional polymer and a catalyst. In this example the anhydride group chemically binds to the functional groups of a fiber and crosslinks the hydroxyl groups, for example. Binding to hydroxyl groups of water and oil repellant polymers imparts an impermeable surface to the fibers by integrating the functionally designed polymer on the surface. In another embodiment, a cross-linking agent, such as an organic titanate, diisocyanate, metal salt or another reactive, functionalized polymer or pre-polymer, is used in place of an anhydride functional polymer to bind the surface modifier to the surface of the reinforcing additive, such as fibers or particulates.

In another embodiment, additional monomers with functional groups that are selected to react with a cross-linking agents are included in the fluoro-polymer synthesis. In one example, water and oil repellant and/or bio-active co-polymers contain monomers that react with metals, and a metal salt is used to crosslink the polymer. For example, additional monomers may contain other functional groups, such as, but not limited to, carboxyl, carboxylate, sulfate, sulfonate, phosphate and phosphonate groups.

In an alternative embodiment, one or more functional co-polymers include a reactive group that chemically bonds to a particulate or fibrous surface without crosslinking the polymer. For example, graft, block and random co-polymers of stearyl (meth)acrylate and maleic anhydride may be used with or without a catalyst to increase the rate of chemical bonding between the functional co-polymers and the fibrous surfaces.

In one method of modifying fibrous surfaces, the fibers are incorporated into a fabric, such as a fiber mat or textile. The fabric is treated with the fluorpolymer either before or after incorporation into the fabric. Next, the fabric is exposed to a solution or emulsion that binds one or more functional groups to the fiber surfaces, for example, by immersing the fabric in an emulsion or solution including a monomer, polymer or co-polymer and a metal salt. The treated fabric is then dried, cured and washed to remove undesired, residual components. Drying and curing is performed either under the same conditions or under differing conditions. For example, the temperature for curing may be either greater or less than the temperature used for drying.

In an alternative method, a polymer is synthesized in situ on a fibrous surface by applying a solution or an emulsion including the desired monomers directly on the fibrous surface. A free radical initiator is applied either with the desired monomers or in a separate step, and the fibrous surfaces are exposed to heat or UV light, for example, after drying the fibrous surfaces. Then, the fibers, mat or textile is washed to remove any undesired, residual components.

In one embodiment, bio-active functional monomers are included in the fluoro-polymer synthesis and impart mold resistance, such as anti-microbial and/or biocidal properties. Alternatively, crosslinking of a bio-active functional polymer, co-polymer or oligomer is achieved by including the bio-active component during application of a metal salt and/or free radical initiators. In another alternative, both bio-active functionality and water and oil repellency are imparted in the same process.

In another embodiment, bio-active functional monomers, oligomers, co-polymers or polymers are polymerized (or further polymerized or crosslinked) in situ around fibrous or particulate surfaces. In one example, another reactive polymer and/or a crosslinking agent is mixed together with the bio-active functional component, binding the bio-active functional component to the fibrous surface. In an alternative example, the bio-active functional components are functional groups on monomers, oligomers, co-polymers and polymers, which are capable of binding to particulate and fibrous surfaces. For example, the monomers, oligomers, co-polymers and polymers bind to functional groups that are bound to the fibrous or particulate surface. Some examples of bio-active functional monomers, oligomers, co-polymers and polymers include, but are not limited to, quaternized amine functional groups, for example, having from 4 to 10 carbons in the alkyl chain. In one specific example, the fungicidal and bactericidal properties have been shown to kill mold after the mold contacts a bio-active coating on the surface of a textile.

In one embodiment, fibers are first treated to provide a desired functional group on the surface of the fiber. Then, the fibers are incorporated into a mat or textile. For example, the fibers may be woven into a fabric or otherwise incorporated into the form of a mat or paper. The fibers may be combined with fibers having no coating or having a coating incorporating a different functional group, providing the paper, mat or fabric with mold resistance and/or other desirable properties, based on the properties of treated fibrous surfaces.

In one embodiment, a facing paper is treated on one surface to impart mold resistance and water repellency. The opposite surface is alternatively untreated or is treated to provide the opposite surface with excellent adhesion with a slurry that forms a wallboard core. Alternatively, the facing paper may be made of multiple plies. For example, an outer ply may be treated to provide bio-active and water repellency to a wallboard, while the innermost ply may be treated to adhere to the core of the wallboard In another example, the outer ply may be treated for water repellency and one or more inner plies may be treated to impart bio-active properties. In yet another embodiment, the outermost ply on an exposed surface is treated to prepare the surface for plastering, stucco, painting, tarring or decorative papering. For example, the outermost ply may be treated to provide a self-stick surface for a later-applied, decorative wallpaper.

In one embodiment, a film forming polymer or mixture of polymers, at least one of which is an at least partially water-soluble or water-swellable strength enhancer is used as a sizing for fibers or is applied to a mat or a fabric. The composition may optionally include a bio-active component and/or a fire retardant to increase fire-resistance. The polymer is preferably cross-linked or treated to prevent complete dissolution of the polymer and subsequent migration away from the fiber during addition to water and subsequent drying.

For example, a water-soluble, film-forming polymer utilized in a sizing composition preferably has a strong interaction with the cementitious matrix. Preferred strength enhancing, film forming polymers of the invention include, but are not limited in any way, to carboxymethyl cellulose (CMC) for Portland cement compositions and cellulose ethers other than CMC or polyvinyl pyrrolidone (PVP) together with an appropriate cross-linker such as polystyrene sulfonate (PSS) for gypsum compositions. Surface modified fibers may be of any denier and length, ranging from continuous, bundled strands, such as those often used in woven meshes, to relatively short, monofilament fibers, such as those used for discrete fiber reinforcement and in some non-woven mats. Herein denier is used as a measure of the fiber mass per unit length in milli-grams per inch (mg/inch), which is an indirect measure of the fiber cross section. Alternatively, a polymer composition is selected that acts as a binder in non-woven fibrous mats, and the mats are used for reinforcing composite cementitious materials.

It is thought, without being limiting in any way, that in one embodiment a polymer coating that is at least partially water soluble or swellable forms an interfacial layer of polymer-enriched slurry adjacent to the fiber. As the set cement dries, the polymer re-forms a film encapsulating the fiber and local cement matrix surrounding it. The polymer binds the fiber to the matrix and reinforces the region surrounding the fiber. This results in an effective transfer of stress between the cement matrix, reinforcing polymer film, and reinforcing fiber when the composite is loaded in tension. In this embodiment, the sizing composition is selected to give a range from 0.5% to 50% solids and an add-on from 1% to 500% to the original fiber. Preferably, from 2% to 20% solids and an add-on of from 20% to 500% are added to the fiber. Strength enhancement in surface modified fiber reinforced composites increases with increasing amounts of polymer add-on.

In one embodiment, the cement is mixed with surface modified fibers and water. The sizing is selected from one of a starch, a starch derivative, a cellulose derivative, an acrylic polymer (commonly polymerized from an acrylic acid, an acrylic salt, an acrylic ester, an acrylamide, a methacrylic acid, or an acrylonitrile monomer), a polyvinyl acetate, a polyvinyl alcohol (PVA), an alginate, and a natural gum. In another embodiment, the sizing comprises emulsions or dispersions of polyesters, polyurethanes, and styrene copolymers. Wallboard reinforced by fibers coated solely with these formulations show some improvement in mechanical strength if the treated fibers are mixed into the slurry gently, as a final step. However, excess water content must be minimized and drying carried out quickly, as low molecular weight and non-crosslinked additives dissolve in the water and tend to migrate away from the fibers and toward the surface of the wallboard over time during drying. Without further treatment these additives often segregate to the surface and serve as nutrients for undesirable microbial, mold and fungus growth. Iodine staining techniques were used to observe this propensity for migration for a polyvinyl pyrrolidone. Preferably, the surface modifier used for surface modification of a reinforcement, such as a particulate or fiber, forms a cohesive bond with the matrix without retarding the set or adversely affecting the growth of inorganic crystals during hydration.

For example, reinforced composite cementitious materials are used for fiber-reinforced cement for cast products, fiber-reinforced gypsum, such as glass-fiber-reinforced gypsum (GFG), cement boards, and patching and joint compounds. In one embodiment glass-fiber-reinforced concrete (GFRC) is prepared having glass fibers that are surface modified by a CMC. Also, fabrics and paper are used with cement as a reinforcement, such as in joint tapes, patching kits, and molded articles. The fibers and fabrics, themselves, can be made by any conventional process or may be specifically designed with functional groups on the fibrous surfaces that react with polymer additives or sizing.

In one embodiment, conventional sizing equipment is configured to apply the polymer additive and to dry and crosslink the polymers. In one embodiment, the surface modified fibers are incorporated into the composites according to conventional methods by merely replacing existing fiber or fabric inclusions.

The preferred polymer for enhancing the strength of a cementitious composite depends on the type of cement to be reinforced and the type of fiber or particles to be used as reinforcements. Carboxymethyl cellulose (CMC) improves the dried strength of Portland cement. However, CMC degrades the mechanical strength of gypsum products. It is thought, without being limiting in any way, that the chelating effect of the carboxyl groups on the growing gypsum crystal surface retards the set, which is at least partially responsible for decreasing the strength of the gypsum matrix.

Other cellulose ethers improve the strength of gypsum. Some of these cellulose ethers are disclosed in U.S. patent application Ser. No. 10/351,675, filed Jan. 23, 2003 and U.S. Patent Application entitled "Reinforced Wallboard," to Tagge et al., filed May 24, 2003, and the description and drawings relating to the improvement in nail pull resistance and flexural strength with addition of cellulose ethers is incorporated herein by reference.

In explanation, the number of substituted hydroxyl groups per anhydroglucose unit is expressed as the degree of substitution (DS). The DS can vary between 0 and 3. As with all polymer reactions, this reaction does not occur uniformly along the polymer chain. The reported degree of substitution is therefore a mean degree of substitution over the whole polymer chain. Alternatively, molar substitution (MS) may be used to report the number of moles of substituent groups, such as a hydroxypropyl group, per mole of anhydroglucose. Often, manufacturers follow a convention whereby one of the substituents is reported by DS and the other by MS, where the substituent reported by MS may replace a hydroxyl group or may attach to another substituent in a chain. The DS is not always reported, and we have found that the value reported is often inaccurate or given as a broad range.

In a preferred embodiment, a methyl cellulose with a low degree of substitution (DS) is used, e.g. less than 1.6, to surface modify a fiber for reinforcement of a composite comprising gypsum and fiber reinforcement. In another preferred embodiment, a polymer additive is crosslinked in situ at least partially reducing the solubility and migration of the polymer additive after forming a surface film on fibrous or particulate additives. For example, polyvinyl pyrrolidone (PVP) is ionically cross-linked in situ by polystyrene sulfonate (PSS), providing surface modification of fibrous and particulate additives. In yet another preferred embodiment, molecular weight of the PVP is selected in a range of at least 10,000 MW, which greatly increases the cohesiveness of the bond produced by the PVP+PSS interfacial layer. The use a cross-linked polymer as a bulk addition is disclosed in co-pending application 10/278,214, filed Oct. 21, 2002, by Tagge et al., the disclosure of which is incorporated herein by reference in its entirety. In yet another preferred embodiment, an HPMC is selected as a surface modifying polymer that provides good adhesion with a matrix comprising gypsum.

It is thought, without being limiting in any way, that intermolecular bonds of the cellulose ethers and ionic crosslinking of PVP and PSS, result in strong adhesion to the matrix comprising gypsum crystals. Also, cohesive forces retain the surface treatment on the surface of the fibers during mixing, setting and drying of the composite slurry. Preferably, the surface treatment is somewhat soluble or swellable in water, resulting in an interfacial layer of polymer that adheres to the fiber and partially penetrates the crystallized particles of cement or gypsum, but resists removal from the surface of the particulate or fiber reinforcement. In a preferred embodiment, PVP is used as a surface modifier of the fibers of a facing material.

Preferably, high molecular weight, e.g. at least 10,000 mW, sizing has lower solids content than conventional sizes; however, the add-on is comparable or even greater, because the increased slurry viscosity of the high molecular weight sizing adds a thicker layer of the sizing during each pass at the fiber through the sizing. Furthermore, cross-linking the surface coating creates a durable coating for fibers or fabrics that is not easily removed during the mixing, setting, or drying steps of fiber-cement production.

In one embodiment, hydrophilic polymer systems are converted to swellable hydrogels upon cross-linking. It is believed, without being limiting in any way, that these swollen coatings allow cement crystal growth into the interfacial layer of the surface modified fiber, while resisting erosion, dissolution, and migration. Fibers with cross-linked surface coatings are used in conventional high-speed mixing procedures such as those found in wallboard production. In one embodiment, the fibers are pre-mixed with dry components of the cement. Alternatively, the fibers are dispersed in water prior to cement mixing or are combined together with both the water and cement and/or calcium sulfate hemihydrate.

Several cross-linking methods are utilized to decrease the solubility of surface coatings. In one embodiment, a sizing is at least partially insolubilized by exposing the sizing to higher temperatures than normal during drying, causing crosslinking of the sizing. Sizing components such as starch and starch derivatives, PVA, CMC, and acrylate polymers, as previously listed above, crosslink at elevated temperatures. Conventional sizing avoids such temperatures to prevent the sizing from becoming insoluble, for example. In another embodiment, radiation, such as ultra-violet (UV) light or gamma rays, can also be used to cross-link some sizing components, such as PVP. In another embodiment, water-insoluble polymers are incorporated into a film forming polymer to physically cross-link the surface treatment. For example, a reactive polymer system, a system of reactive pre-polymers, or a latex, preferably with an internal cross-linker, may be mixed with hydrophilic polymers and reacted to lower the solubility of the resulting film on the reinforcing additive, such as a particulate or fibrous reinforcement.

In an alternative embodiment, a film forming polymer is chemically cross-linked to form a hydrogel. For example, cross-linking agents for cellulose ethers include organic titanates, organic zirconates, and dialdehydes, such as glyoxal and gluturaldehyde. Borax and sodium trimetaphosphate for preferred for starches, and calcium chloride with peroxide, PSS and UV light are preferred for PVP. In one preferred embodiment, the cross-linking system is relatively stable and is preferably enhanced during or after drying by the elevated temperature, which allows swelling during setting but avoids migration of the polymer during drying and weakening of the bond if a cementitious building material becomes wet, for example, by flooding or exposure to high humidity.

In one embodiment, HPMC is crosslinked by a chelated organic titanate which is activated at temperatures above 100 degrees centigrade. In another embodiment, a cross-linking agent is applied to only the outermost region of the surface coating, forming a surface cross-linked polymer coating with delayed solubility. In another preferred embodiment, a surface coating polymerizes in situ on a fiber in combination with a crosslinking agent. For example, the free radical polymerization of 1-vinyl 2-pyrrolidone with 1,6-hexanediol diacrylate is used to form a surface coating on a fiber for use in cementitious composite materials.

In another embodiment of a multifunctional surface modifying film, a coupling agent is selected to improve the bond between the size and the fiber, promoting adhesion. For example, a silane coupling agent is added to a surface modifying formulation. Alternatively, the coupling agent is applied to the fibers or fabric as a primer before application of the surface treatment. In a preferred embodiment, a cross-linking agent, such as an organic titanate, acts as both the crosslinking agent and the coupling agent, chemically bonding the surface treatment to the fiber. For example, hydroxyl functional groups of the fibrous surface of a fabric are used to couple the fiber surface to a surface modifying polymer film. In one embodiment, the layer of the surface treatment adjacent to the fibrous surface is cross-linked by the coupling/crosslinking agent, but the exterior of the surface treatment is either not cross-linked or is less highly cross-linked than the interfacial layer adjacent to the fibrous surface. In one preferred embodiment, a plasticizer, such as polyethylene glycol or glycerol, may be included in the surface coating composition to increase the flexibility and toughness of the coating.

Preferred fibers to be sized with the inventive composition include monofilament, bundled, and spun strands of various materials, including inorganic fibers, such as glass, mineral wool, and steel, synthetic fibers, such as polypropylene, polyester, and nylon, and natural fibers, such as cotton, hemp, and wood fibers. In one embodiment, bundled and chopped spun strands are designed to separate when mixed with the slurry, allowing the treated fibers to be embedded in the matrix material. In an alternative preferred embodiment, the sizing composition and slurry mixing conditions are controlled to maintain an intact surface coating around a fiber bundle or strand, while allowing for some separation of the individual fibers. This provides a larger effective surface area of the fibers for adhesion to the size and cement matrix. The surface coating acts as a binder, allowing discrete bundles or spun strands of fibers that would normally separate into individual filaments when mixed in a slurry.

In one embodiment, the fiber is immersed in the surface coating material, dried, woven if desired, and cut to the desired dimensions in an automated process. For example, bundled fiberglass strands sized with a cross-linking CMC composition may be woven or arranged into a mesh and embedded as reinforcement in cement boards. In one embodiment, chopped or other types of discrete fibers are sized by spraying them with a sizing solution while they are suspended in air. In another embodiment, individual fibers are coated by a surface coating in a solvent or emulsion and are agglomerated into a mat of fibers, and each coating process is repeated any number of times to achieve a desired thickness of add-on and optional crosslinked with condensates, such as melamine formaldehyde or urea formaldehyde.

In one preferred embodiment, a fiber or fibers is coated by a cellulose ether (CE), such as a CMC, MC, HPMC or hydroxy ethyl methyl cellulose at an elevated temperature, at which the cellulose either particles have low solubility. Powdered CE's are dispersed in hot water without hydrating or dissolving them, maintaining a low viscosity even at high concentrations of CE's. As the solution cools, as when exposed to a cool fiber or fabric or to air, the CE hydrates, forming a semi-solid gel.

In an alternative embodiment, a surface-treated (HEMC), delayed-solubility CE is used. Preferably, the surface-treated, delayed-solubility cellulose ether is coated with an aldehyde, more preferably a gluturaldehyde, imparting bio-active properties to the fibers and the composite, while delaying dissolution of the cellulose ether. For example, fiber immersion sizing (single or double) with a high molecular weight cellulose ether achieves an add-on thickness greater than 25%.

In one embodiment, fabrics or papers are sized by immersing the fabric or paper sheet in the surface modifying composition. In another embodiment, a surface modifier is sprayed onto one or both sides a fabric or paper layer.

In another embodiment, a fiber mat is formed by evenly dispersing chopped fibers in solution for surface modifying the fibers. Then, the fibers are evenly spread, and the dispersion is drained over a wire mesh. Next, the surface modified fiber mat is dried. Alternatively, the mat is first compressed to force liquid out of the mesh. For example, the fibers may be glass fibers, the surface coating may be PVP, and the PVP may be crosslinked by PSS and/or UV light before and/or after the mat is dried. In an alternative embodiment, pressure or vacuum is applied before the wet fiber mat is dried, degassing the fibers and improving penetration of the surface modifying solution.

In one preferred embodiment, intermingling of the polymer and the cement or gypsum crystals in the matrix is increased by incorporating inorganic particles in the sizing formulation. For example, the inorganic particles, such as accelerant, act as seeds for the precipitation of cement crystals, causing cement crystals to grow directly from the surface coating and improving adhesion with the matrix. Also, inorganic particles may be added that act as a fire-retardant filler, improving the fire-resistance. Preferably, inorganic particles are one of ground cement and limestone in cement compositions, and ground gypsum ball mill accelerator for gypsum compositions.

In an additional embodiment, the surface coatings are used to coat other types and forms of materials in addition to fibers. For example, reinforcing polymer coatings can be used to coat reinforcing aggregate, lightweight filler and wire mesh. The surface modifiers are preferably multifunctional, providing cohesion and protecting against corrosion, for example. Also, the surface coating may be added primarily for its bio-active properties, rather than the improvement in cohesion.

Figure 3:
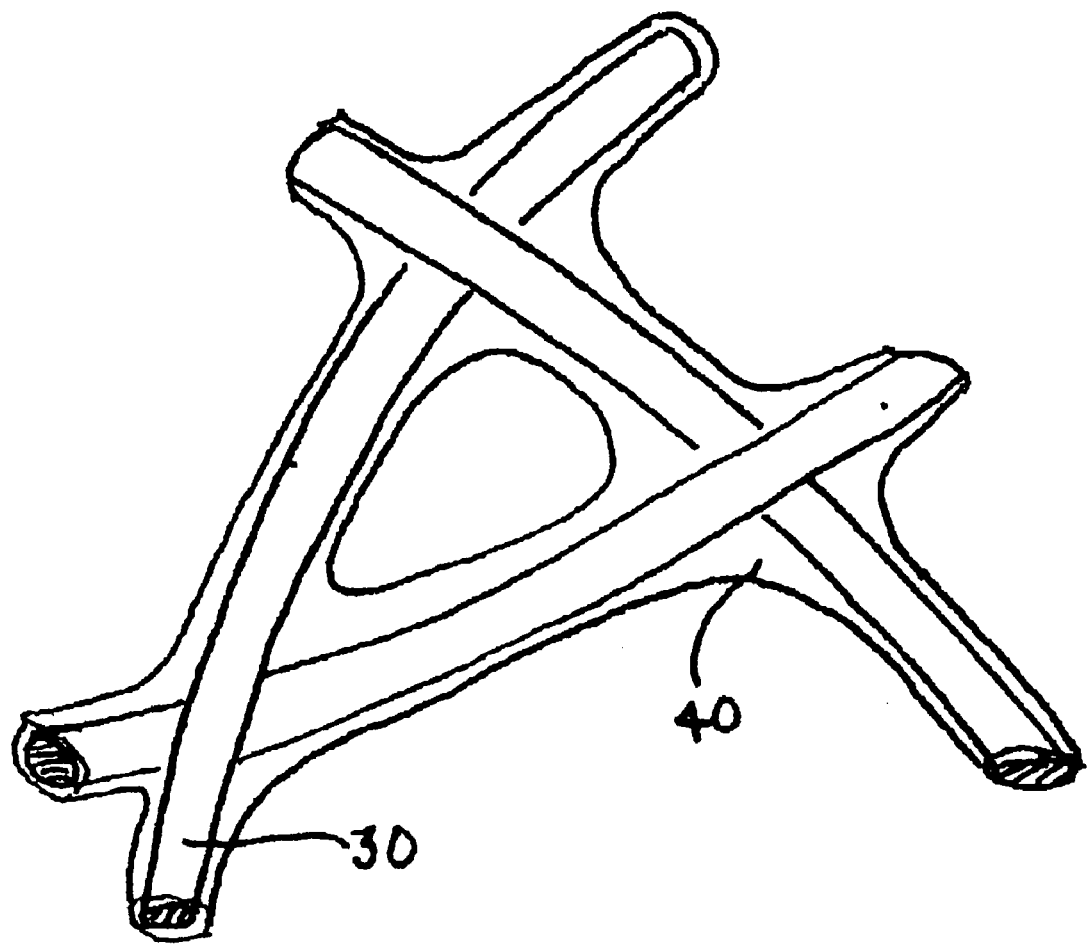
FIG. 3 shows a sketch of one embodiment of the invention having textile strands 30 coated with a bio-active additive 40.
Figure 4:
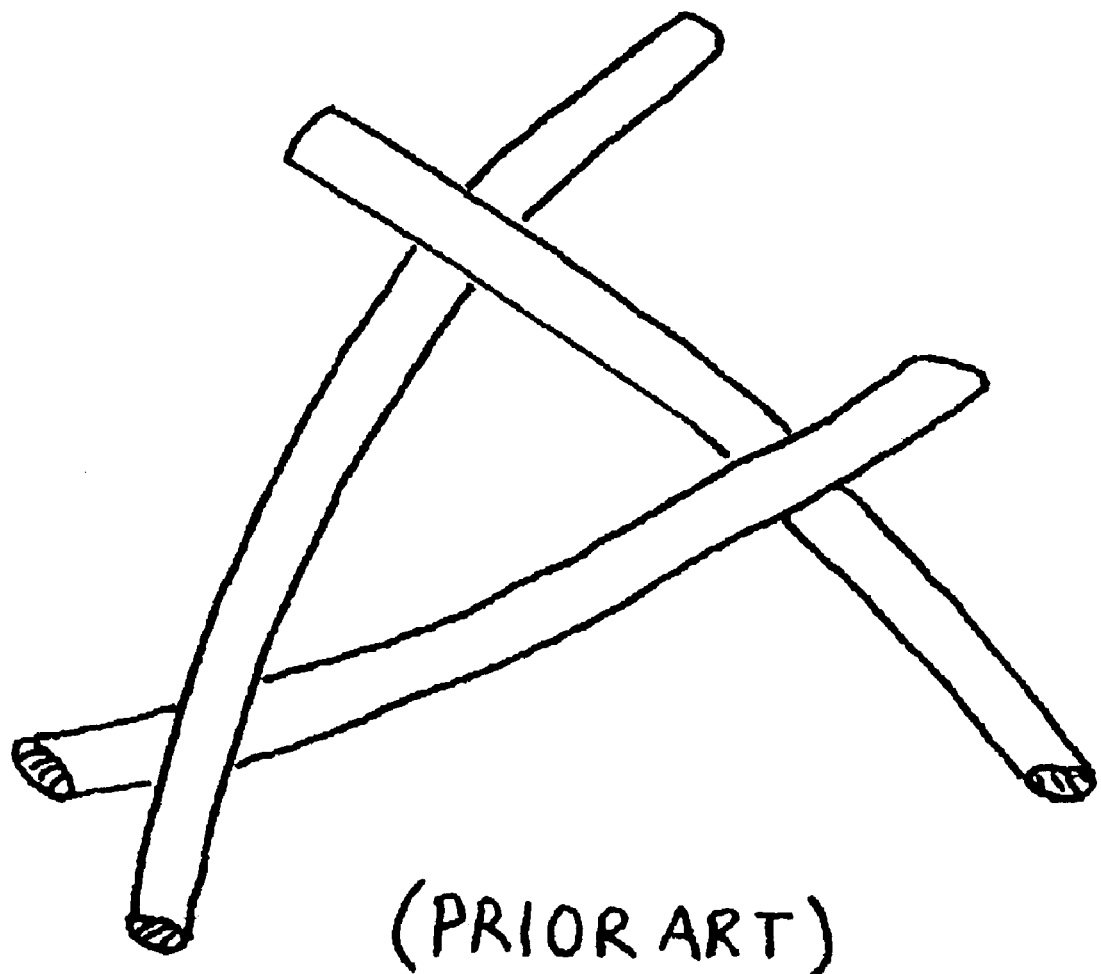
FIG. 4 shows a sketch of strands of a conventional textile of the prior art after the sizing is removed.
Figure 5A:
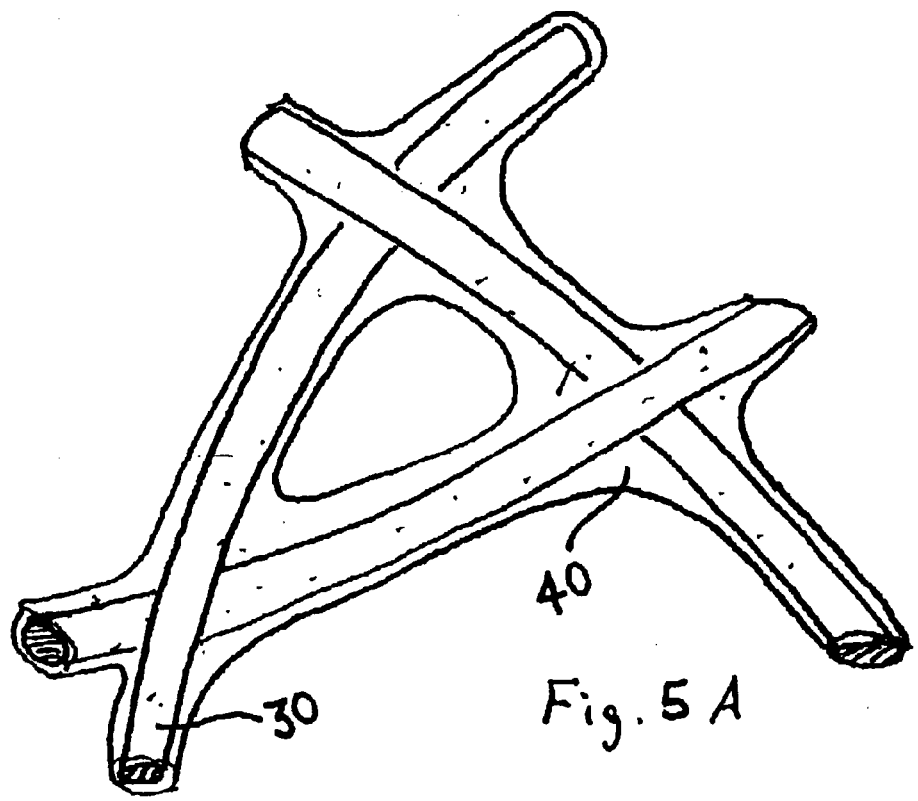
FIG. 5A shows a sketch of the embodiment of FIG. 3 after exposure to mold in an environment conducive to mold growth.
Figure 5B:
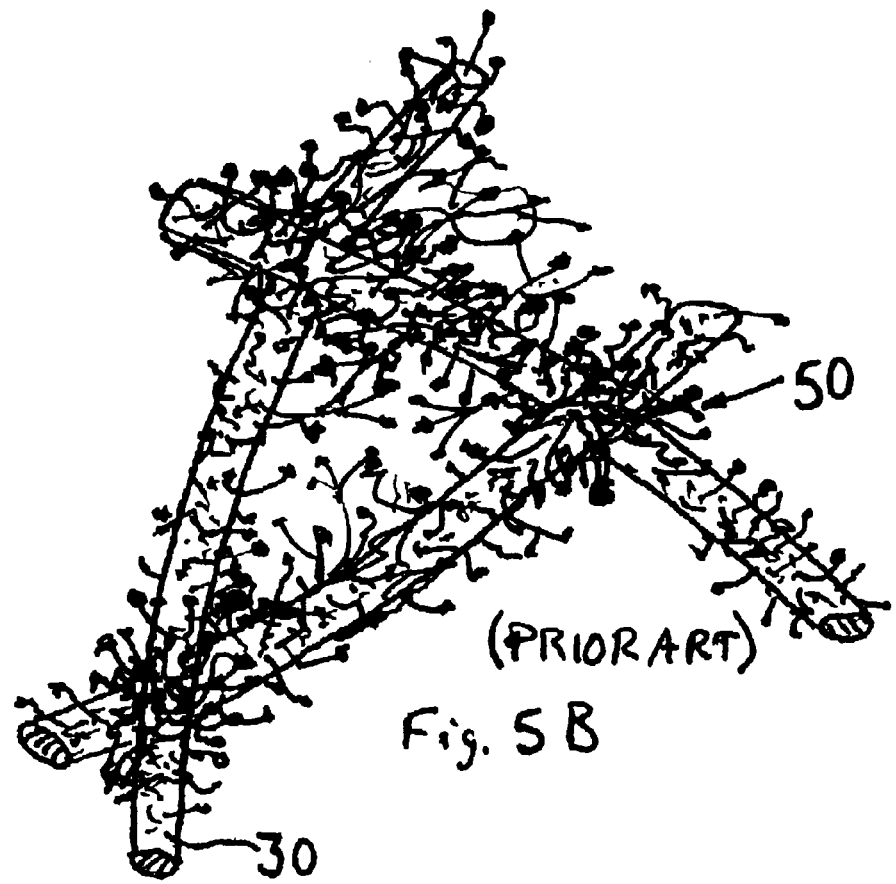
FIG. 5B shows a sketch of the conventional textile after exposure to mold in an environment conducive to mold growth.

FIG. 3 shows a sketch of one embodiment of the invention showing a textile 30 coated with a bio-active polymer 40. In contrast to the conventional textile, as shown in FIG. 4, the textile in FIG. 3 has a thin layer of the bio-active polymer 40 on the fibrous surfaces of the textile 30. FIGS. 5A and 5B show a sketch of the results of an experiment that exposed both of the surfaces to the same mold-containing emulsion, which was then encouraged to grow by placing both of the samples in a warm, humid environment. After a short period of time, the untreated textile, for example as sketched in FIG. 5B, showed evidence of mold growth. In contrast, the sample having fibers 30 coated with the bio-active polymer 40 showed no mold growth. Instead, the mold was killed by the bio-active polymer 40.

In one alternative embodiment, the surface modifier is applied to a surface of a fabric or paper, such as a fiber-reinforced paper or a re-pulped, recycled paper, such that the treatment does not penetrate the surface or only partially penetrates the surface. Thus, the properties imparted to the fabric or paper have a functional gradient from the exterior surface toward the interior.

EXAMPLES

The following examples are intended merely as examples, and the invention is not to be limited thereby.

Quarternization of Poly(vinylpyridine). An amount of 6 g of poly(4-vinylpyridine) MW 160,000 was dissolved in 80 g of nitromethane. The temperature of the solution was brought to 96° C. An amount of 10 g of hexyl bromide was added dropwise to the solution which was then left to stir for 4 hr. During the mixing, the color of the yellow solution became darker. After 4 hr, the solution was precipitated in 400 mL of toluene. The fibrous solid was filtered and washed with 100 mL of acetone. The quaternized polymer was dried in an oven at 180° C. for 30 minutes.

Use of Quarternized Poly(vinylpuridine). An amount of 100 parts of β-calcium sulfate hemihydrate was mixed with 0.5 parts of quaternized poly(vinylpyridine), 0.13 parts accelerator and 0.2 parts of dispersant. The mixture was then added to 150 parts of water containing a small percentage of retarder and blended at a high shear setting for approximately 20 seconds. The resulting slurry was poured directly from the laboratory blender to a mold measuring 12 in×14 in×0.5 in. After setting, the sample was removed from the mold and cured at 45° C. for 2 days.

Poly(vinylpyridine) Bio-Active Film. A fibrous polyester material was coated with a poly(vinylpyridine) bio-active film. A solution was made of the following: 6 g of 4-vinylpyridine, 0.12 g of divinylbenzene, 0.12 g of benzoyl peroxide, and 6 g of methanol. One each of a 2"×2" polyester pad and a glass mat were dipped in the solution and then were exposed to ultraviolet light for about 3 hours (plus or minus 10 minutes). Then, the pad and mat were immersed in a solution of 10 milli-liters of nitromethane/hexyl bromide (10:1, vol/vol) and placed in an oven at 80° C. for 4 h. After heating, the pad and mat were cooled to room temperature.

A mold solution was prepared. Two Petri dishes of potato dextrose agar were stored in a humid environment. After 3 days, a dense layer of mold was evident. In a 1000 mL flask, 10 g of potato dextrose starch was added to 500 mL of water. The mixture was heated with stirring until the starch dissolved and was then cooled to room temperature. Two drops of Triton-X was added. The moldy agar from the two Petri dishes was then added and the mixture was stirred for 30 min. The mixture was filtered and the dark green filtrate was collected in a spray bottle. For comparison, samples of an untreated polyester material and glass mat and the treated polyester pad and glass mat were each sprayed twice with the mold solution. The samples were then stored in a humidity chamber at 37 degrees C. and 90% humidity. After 5 days, both the untreated glass mat and the untreated polyester material exhibited mold growth while the bio-active, anti-fungal coated samples were free from mold growth. The samples were observed for a period of five weeks during which no mold growth was observed on the treated samples.

Glass Fiber Gypsum, No Size. As a comparative example, strands of fiber were removed from a sheet of woven type E fiberglass boat cloth. The strands were cut into 4" sections and individually massed to determine fiber denier. The specimens were then embedded in the center of a 9"×1"×½" gypsum block. The fibers were oriented parallel to the ½" direction with approximately one inch spacing between each fiber. The mold was constructed with the fibers suspended between two sets of clamped ½" zinc bars with two ½" plastic spacers. Three inches of fiber were left exposed from the gypsum block on one side for clamping to the testing apparatus.

One hundred grams of beta calcium sulfate hemi-hydrate stucco was mixed with 0.13 g of ground gypsum ball mill accelerator. This powder was added to 150 g tap water and mixed in a Waring blender at low speed for 15 seconds. The slurry was then poured into the mold around the suspended fibers. The block was removed from the mold after 20 minutes of setting and dried in a convection oven at 45 C for 24 hours.

After drying, the block was massed to determine matrix density. The pull-out characteristics of each fiber were tested using an Instron mechanical testing machine at a displacement rate of one inch per minute.

The gypsum density was 0.62 g/cc, the average fiber denier was 3.5 mg per inch, and the average pull-out strength was 2.62 lbs with a standard deviation of less than 5%.

Glass Fiber Gypsum, Polyurethane Latex Surface Modifier. As another comparative example, a commercially available polyurethane latex emulsion with an internal crosslinker was used as a surface modifier. The surface modifier was applied at room temperature to strands removed from a sheet of woven type E fiberglass boat cloth. The surface modifier was applied by winding the strands onto a small roller, submerging the roller in the sizing composition, and unwinding the strands through the composition. The fiber strands were then weighted with a small clip on one end to prevent warping and hung to dry in a 45 C convection oven for 30 minutes. The dried fibers were cut to 4" sections, massed, and embedded in a gypsum block following the procedure from the Glass Fiber Gypsum, No Size Example. The pull-out strength of the fibers was also tested. The results were recorded and compared to determine the amount of size add-on and pull-out strength improvement from control fibers in the same matrix. Pullout strength improvement indicates the increase in pullout strength over that for a glass fiber with no sizing (negative indicates a decrease in strength).

| Fiber Denier (mg/in) | Pull-Out Strength (lbf) | Energy at Yield (lbf-in) | Add-On (% wt) | Pull-Out Strength Improvement |
|---|---|---|---|---|
| 8.0 | 2.3 | 0.023 | 128% | −14% |
| 8.4 | 3.0 | 0.101 | 138% | 13% |
| 8.6 | 2.3 | 0.027 | 144% | −12% |
| 8.6 | 2.5 | 0.102 | 144% | −6% |
| 9.2 | 2.5 | 0.009 | 162% | −6% |
| 9.3 | 3.0 | 0.041 | 166% | 13% |
| 9.4 | 2.1 | 167% | 167% | −20% |

Glass Fiber Gypsum, Waterborne Epoxy Size. Also included for comparison is a waterborne epoxy surface modifier. A sizing composition was prepared by mixing 100 g of Epirez 3519 50% solids waterborne epoxy emulsion with EpiCure curing agent, both from Shell. The surface modifier was applied at room temperature to strands removed from a sheet of woven type E fiberglass boat cloth as in the previous example. The fiber strands were then weighted and hung to dry in a 100 C convection oven for 2 hours. The dried, cured fibers were then cut to 4" sections, massed, and embedded in a gypsum block following the procedure from the Glass Fiber Gypsum, No Size Example. The pull-out strength of the fibers was also tested. The results were recorded and compared to determine the amount of size add-on and pull-out strength improvement from control fibers in the same matrix.

| Fiber Denier (mg/in) | Pull-Out Strength (lbf) | Energy at Yield (lbf-in) | Add-On (% wt) | Pull-Out Strength Improvement |
|---|---|---|---|---|
| 7.7 | 1.8 | 0.057 | 118% | −30% |
| 8.5 | 2.0 | 0.056 | 142% | −24% |
| 8.7 | 2.1 | 0.042 | 147% | −18% |
| 8.7 | 1.4 | 0.013 | 148% | −47% |
| 8.7 | 1.5 | 0.022 | 148% | −43% |
| 9.2 | 1.7 | 0.038 | 162% | −36% |
| 9.5 | 2.0 | 0.048 | 170% | −22% |

The polyurethane latex surface modifier and waterborne epoxy surface modifier are included for comparison with some preferred embodiments of the invention. Interfacial bond strength was not improved by adding these sizes between the cement and the fiber. Instead, polyurethane latex and waterborne epoxy reduced the pull-out strength, despite the increased surface contour and denier of the fiber. This may explain why sizing is removed as part of conventional processes, because one of ordinary skill in the art would not expect sizing to improve pullout strength.

Glass Fiber Gypsum High Molecular Weight HPMC Surface Modifier. A sizing composition was prepared by mixing 5 g of Methocel 240 from Dow Chemical (40,000 cps @ 2 wt %, 25 C) into 100 g of 85 C tap water. The dispersion was mixed for 5 minutes and then cooled to 45 C. The surface modifier was applied to strands removed from a sheet of woven type E fiberglass boat cloth by winding the strands onto a small roller, submerging the roller in the surface modifier composition, and unwinding the strands through the composition. The fiber strands were then tensioned and hung to dry in a 45 C convection oven for 30 minutes. The dried fibers were cut to 4" sections, massed, and embedded in a gypsum block following the procedure from the Glass Fiber Gypsum, No Size Example. The pull-out strength of the fibers was also tested. The results were recorded and compared to determine the amount of size add-on and pull-out strength improvement from control fibers in the same matrix.

| Fiber Denier (mg/in) | Pull-Out Strength (lbf) | Energy at Yield (lbf-in) | Add-On (% wt) | Pull-Out Strength Improvement |
|---|---|---|---|---|
| 3.6 | 1.3 | 0.005 | 3% | −51% |
| 3.7 | 1.7 | 0.011 | 6% | −36% |
| 3.8 | 0.6 | 0.002 | 7% | −77% |
| 3.9 | 1.3 | 0.004 | 11% | −49% |
| 4.1 | 2.7 | 0.024 | 17% | 5% |
| 4.4 | 3.9 | 0.028 | 24% | 48% |
| 5.4 | 7.5 | 0.217 | 54% | 185% |
| 10.8 | 10.1 | 0.877 | 208% | 285% |

These results show that with less add-on, such as used in conventional sizing applications, the Methocel lowers the pull-out strength of the fiber. It is believed, without limiting in any way, that the weakening is due to migration of the water-soluble polymer away from the fiber, leaving a void and a weak interface between the fiber and cement matrix. However, increased add-on resulted in significantly improved pull-out strength and energy.

Glass Fiber Gypsum, Low Molecular Weight HPMC Surface Modifier. A composition was prepared by mixing 30 g of low molecular weight HPMC from Aldrich (5 cps @ 2 wt %, 25 C) into 100 g of 85 C tap water. The dispersion was mixed for 5 minutes and then cooled to 25 C The surface modifier was applied to type E boat cloth glass fiber as described previously, and the fiber strands were then tensioned and hung to dry in a 45 C convection oven for 30 minutes. The dried fibers were cut to 4" sections, massed, and embedded in a gypsum block following the procedure from the Glass Fiber Gypsum, No Size Example. The pull-out strength of the fibers was also tested. The results were recorded and compared to determine the amount of size add-on and pull-out strength improvement from control fibers in the same matrix.

| Fiber Denier (mg/in) | Pull-Out Strength (lbf) | Energy at Yield (lbf-in) | Add-On (% wt) | Pull-Out Strength Improvement |
|---|---|---|---|---|
| 7.4 | 1.6 | 0.004 | 111% | −39% |
| 8.6 | 0.3 | 0.001 | 145% | −90% |
| 9.8 | 2.7 | 0.023 | 179% | 5% |
| 11.0 | 0.6 | 0.003 | 214% | −77% |
| 11.8 | 2.9 | 0.011 | 236% | 11% |
| 13.8 | 4.7 | 0.061 | 293% | 80% |
| 20.5 | 16.4 | 0.231 | 483% | 527% |
| 20.8 | 11.5 | 0.712 | 492% | 340% |

Low molecular weight CEs do not improve fiber-cement adhesion as much as their high molecular weight counterparts. Much more add-on of a low molecular weight HPMC surface modifier is required to achieve the same improvement in pull-out strength as high molecular weight HPMC surface modifier. For example, the pull-out energy of a fiber sized with 200% add-on of 40,000 cps HPMC is greater than that of a fiber with 500% add-on of 5 cps HPMC. It is thought, without being limiting, that low molecular weight reinforcing polymers migrate more easily in the drying cement.

Glass Fiber Gypsum High Molecular Weight HPMC/Polyurethane Latex Surface Modifier. A surface modifying composition was prepared by adding 4 g of Airflex 423, a 50% solids polyurethane latex emulsion with an internal cross-linker from Air Products Inc., to 100 g of 85 C tap water. Three grams of Methocel 240 (40,000 cps @ 2 wt %, 25 C) from Dow Chemical was then added to the mixture. The dispersion was mixed for 5 minutes and then cooled to 45 C. The surface modifier was applied to type E boat cloth glass fiber as described previously, and the fiber strands were then tensioned and hung to dry in a 45 C convection oven for 30 minutes. The dried fibers were cut to 4" sections, massed, and embedded in a gypsum block following the procedure from the Glass Fiber Gypsum, No Size Example. The pull-out strength of the fibers was also tested. The results were recorded and compared to determine the amount of size add-on and pull-out strength improvement from control fibers in the same matrix.

| Fiber Denier (mg/in) | Pull-Out Strength (lbf) | Energy at Yield (lbf-in) | Add-On (% wt) | Pull-Out Strength Improvement |
|---|---|---|---|---|
| 3.8 | 3.0 | 0.012 | 9% | 13% |
| 4.0 | 3.7 | 0.019 | 15% | 39% |
| 4.3 | 5.0 | 0.037 | 23% | 93% |
| 4.4 | 5.6 | 0.039 | 26% | 115% |
| 4.8 | 7.3 | 0.064 | 35% | 179% |

The latex component of this surface modifier functions mainly to physically cross-link the HPMC and create a more uniform coating. Fibers coated with a surface modifier that is physically or chemically cross-linked demonstrate improved fiber pull-out strength even with conventional amounts of sizing add-on. Because the surface modifier does not migrate away from the fiber, it remains an effective reinforcement, even at low levels. It is observed that fiber pull-out strength increases linearly with sizing add-on within the limits tested here. Thus, this crosslinked surface modifier has a much greater pullout strength than non-crosslinked HPMC having similar add-on.

Glass Fiber Gypsum, High Molecular Weight HPMC/Organic Titanate. A surface modifying composition was prepared by mixing 3 g of Methocel 240 from Dow Chemical (40,000 cps @ 2 wt %, 25 C) into 100 g of 85 C tap water. The dispersion was mixed for 5 minutes and then cooled to 60 C. Five drops of Tyzor 131, organic titanium chelate, from DuPont Chemical were added to the dispersion. This mixture was mixed for an additional 10 minutes and then cooled to 45 C. The surface modifier was applied to type E boat cloth glass fiber as described previously. The fiber strands were then tensioned and hung to dry in a 45 C convection oven for 30 minutes. The dried fibers were cut to 4" sections, massed, and embedded in a gypsum block following the procedure from the Glass Fiber Gypsum, No Size Example. The pull-out strength of the fibers was also tested. The results were recorded and compared to determine the amount of surface modifier add-on and pull-out strength improvement from control fibers in the same matrix.

| Fiber Denier (mg/in) | Pull-Out Strength (lbf) | Energy at Yield (lbf-in) | Add-On (% wt) | Pull-Out Strength Improvement |
|---|---|---|---|---|
| 3.8 | 4.9 | 0.011 | 9% | 86% |
| 4.4 | 5.2 | 0.231 | 24% | 97% |
| 4.4 | 7.7 | 0.712 | 25% | 195% |
| 4.7 | 8.1 | — | 33% | 209% |

Glass Fiber Gypsum, High Molecular Weight Surface Treated HEMC/Melamine Sulfonate. A sizing composition was prepared by mixing 1 g of sulfonated melamine polycondensate (Melment F17G from Degussa) and 3 g of surface treated, high viscosity HEMC (Culminal 15000PFR from Hercules) into 100 g of tap water at room temperature. The mixture was stirred for two minutes. Ten drops of a 1% solution of calcium hydroxide was then added to the mixture, which was stirred for another five minutes. The resulting solution of surface modifier was applied to type E boat cloth glass fiber as follows. Glass fiber strands measuring approximately two feet long were tensioned across a cardboard frame. The frame and fibers were placed over wax paper and the surface modifier was applied by spreading it across the fibers. The frame was then lifted away from the paper, pulling the fibers through the sizing solution. The fibers were then dried in the framework in a 120° C. convection oven for 30 minutes. The fiber coating had good mechanical properties and excellent swelling characteristics.

Glass Mat—High Molecular Weight PVP/PSS Size. A glass mat was produced mixing 2 g of PVP, 1.3M MW, 0.5 g of PSS, IM MW, and 5 grams of chopped glass strand (as used in gypsum wallboard production) in 300 g of water with an overhead stirrer for one minute at 1500 RPM. The high viscosity gel of high molecular weight surface modifier quickly dispersed the strands into its individual fibers. The dispersion was then poured onto a wire mesh and spread into a layer of even thickness. The solution was allowed to drain for several minutes before drying the mesh in a convection oven at 45 C for 2 hours. The glass mat was then peeled away from the wire mesh. The resulting surface modified fiber mat had an average thickness of 25 mils or 0.64 mm and a weight of 2.2 lbs per sq. ft. or 10.8 g per sq meter. The mat had good mechanical strength and excellent adhesion to gypsum and cement were observed in tests preparing composite panels Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A composite structure comprising:
   a matrix material; and
   surface-modified reinforcements distributed in at least a portion of the matrix material wherein the reinforcements are surface-modified by multifunctional molecules having a plurality of functions and one of the functions is to anchor the molecules to one of the reinforcement and the matrix.

2. The composite structure of claim 1, wherein another of the functions is to form crosslinks with other multifunctional molecules.

3. The composite structure of claim 1, wherein the matrix is of gypsum, and one of the functions is to anchor the molecules to the gypsum.

4. The composite structure of claim 1, wherein another of the functions is to repel water molecules.

5. The composite structure of claim 1, wherein another of the functions comprises bioactivity.

6. The composite structure of claim 1, wherein the reinforcements comprise wood fibers surface modified by a stearoyl chloride.

7. The composite structure of claim 1, wherein the reinforcements comprise glass fibers surface modified by a 3-aminopropyltriethoxysilane hydrolyzed under acidic conditions in the presence of the glass fibers.

8. The composite structure of claim 7, wherein the glass fibers are further modified with a polyisocyanate crosslinking the multifunctional molecules.

9. The composite structure of claim 8, wherein the crosslinking forms a network of crosslinked surface-modified glass fibers within the cementitious matrix material.

10. The composite structure of claim 3, wherein the reinforcements are of cellulose, and the reinforcements are surface-modified by a gypsophilic polymer, anchoring the reinforcements to the gypsum.

11. The composite of claim 10, wherein the multifunctional molecule is covalently attached to the reinforcements by partial reaction of a polyanhydride with the hydroxyl groups of the cellulose, and at least a portion of the remaining anhydride groups are hydrolyzed to carboxylic acids, and the carboxylic acid groups anchor to the gypsum crystals.

12. The composite structure of claim 1, wherein the reinforcements are of a synthetic and the multifunctional molecule is a hydrophilic polymer.

13. The composite structure of claim 12, wherein the matrix material comprises concrete.

14. The composite structure of claim 13, wherein the synthetic fibers are of nylon.

15. The composite structure of claim 13, wherein the hydrophilic polymer is one of a polycarboxylic acid and a sulfonate.

16. The composite structure of claim 15, wherein the synthetic fibers are partially reacted with a polyanhydride, and at least a portion of the unreacted anhydrides are hydrolyzed to carboxylate groups of the polycarboxylic acid forming poly(carboxylate) tendrils that anchor the fibers to the concrete during hydration of the concrete.

17. The composite structure of claim 16, wherein the polyanhydride is of poly(maleic anhydride).

18. The composite structure of claim 12, wherein the matrix material comprises gypsum.

19. The composite structure of claim 18, wherein the synthetic fibers are of nylon.

20. The composite structure of claim 18, wherein the synthetic fibers are surface modified by attachment of a gypsophilic polymer.

21. The composite structure of claim 20, wherein the gypsophilic polymer is one of a polycarboxylic acid and a sulfonate.

22. The composite structure of claim 21, wherein the gypsophilic polymer is of a polycarboxylic acid, and the synthetic fibers are partially reacted with a polyanhydride, and at least a portion of the unreacted anhydride groups are hydrolyzed to the carboxylic acid forming poly(carboxylate) tendrils that anchor the synthetic fibers to the gypsum.

23. The composite structure of claim 21, wherein the structure further comprises at least one surface layer and at least one inner layer adjacent to the surface layer, wherein the inner layer has a lower density of synthetic fibers than the surface layer.

24. The composite structure of claim 23 for use as a paperless wallboard, wherein the surface layer is thinner than the inner layer.

25. The composite structure of claim 4 for use as an exterior surface of a wallboard, wherein the reinforcements are of cellulose, and at least a portion of the hydroxyl groups of the cellulose react with a multifunctional molecule having anhydride groups to anchor the molecule to the reinforcements and a hydrophobic group to repel water.

26. The composite structure of claim 25, wherein the hydrophobic group is of a hydrocarbon or a fluorocarbon.

27. The composite structure of claim 1, wherein the reinforcements are of a synthetic, and the multifunctional molecules have reactive groups that partially react with the synthetic to attach the multifunctional molecules to the surface of the synthetic, and the unreacted reactive groups hydrolyze to form amine groups, and the amine groups react with a polymeric additive in the matrix to crosslink the multifunctional molecules to the polymeric additive.

28. The composite structure of claim 27, wherein the reinforcements are nylon fibers.

29. The composite structure of claim 28, wherein the multifunctional molecule is of a polyisocyanate.

30. The composite structure of claim 29, wherein the additive is of a polyurethane pre-polymer.

31. The composite structure of claim 30, wherein the polyurethane pre-polymer comprises a polyether terminated with diisocyanates.

32. The composite structure of claim 1, wherein the multifunctional molecules are comprised of a mixture of fluroaliphatic (meth)acrylate monomers, hydroxyalkyl (meth)acrylate monomers, stearyl (meth)acrylate monomers and chlorinated monomers.

33. The composite structure of claim 32, wherein the multifunctional molecules are polymerized and further comprise additional monomers with functional groups that react with one of a metal or metal salt to crosslink the surface modifier.

34. The composite structure of claim 32, wherein the multifunctional molecules are polymerized and further comprise additional monomers having a functional group selected from one of a carboxyl, carboxylate, sulfate, sulfonate, phosphate and phosphonate.

35. The composite structure of claim 34, wherein the additional monomers have a functional group selected from one of a carboxylate and a carboxyl.

36. The composite structure of claim 1, wherein the multifunctional molecules are polymerized, and the multifunctional molecules are comprised of co-polymers of stearyl (meth)acrylate and maleic anhydride.

37. The composite structure of claim 1, wherein the reinforcements are fibrous.

38. The composite structure of claim 37, wherein the reinforcements are incorporated into a fabric.

39. The composite structure of claim 38, wherein the multifunctional molecules are crosslinked after the reinforcements are incorporated into a fabric.

40. The composite structure of claim 38, wherein the multifunctional molecules are polymerized using a free radical initiator and a UV light source after the fabric is dry.

41. The composite structure of claim 5, wherein the multifunctional molecules comprise quarternized amine functional groups.

42. The composite structure of claim 41, wherein the quarternized amine functional groups comprise alkyl chains, each alkyl chain having 4 to 10 carbon atoms.

43. The composite structure of claim 4, wherein another of the functions comprises bioactivity.

44. The composite structure of claim 1, wherein the multifunctional molecules comprise a cellulose ether.

45. The composite structure of claim 44, wherein the cellulose ether is of a carboxymethyl cellulose.

46. The composite structure of claim 44, wherein the cellulose ether is of a methyl cellulose.

47. The composite structure of claim 44, wherein the cellulose ether is of a hydroxypropyl methyl cellulose.

48. The composite structure of claim 44, wherein the cellulose ether is of a hydroxyethyl methyl cellulose.

49. The composite structure of claim 44, wherein the multifunctional molecules further comprise a crosslinking agent.

50. The composite structure of claim 49, wherein the crosslinking agent comprises a polyurethane latex.

51. The composite structure of claim 49, wherein the crosslinking agent comprises an organic titanate.

52. The composite structure of claim 1, wherein the multifunctional molecules comprise polyvinyl pyrrolidone and polystyrene sulfonate.

53. The composite structure of claim 44, wherein the cellulose ether has a viscosity grade of at least 1000 cps, whereby the cellulose ether has limited mobility when mixed in an aqueous slurry.

54. The composite structure of claim 18, wherein the synthetic fibers are of polyester.

55. The composite structure of claim 54, wherein the synthetic fibers are surface modified by attachment of a gypsophilic polymer.

* * * * *